(12) United States Patent
Tonomura et al.

(10) Patent No.: US 6,183,365 B1
(45) Date of Patent: Feb. 6, 2001

(54) MOVEMENT MEASURING DEVICE, ELECTRONIC GAME MACHINE INCLUDING MOVEMENT MEASURING DEVICE, AND METHOD OF PLAYING GAME MACHINE

(75) Inventors: Keisuke Tonomura; Masakatsu Yamagishi, both of Fussa (JP)

(73) Assignee: Casio Computer Co., Ltd., Tokyo (JP)

( * ) Notice: Under 35 U.S.C. 154(b), the term of this patent shall be extended for 0 days.

(21) Appl. No.: 09/011,500

(22) PCT Filed: May 23, 1997

(86) PCT No.: PCT/JP97/01730

§ 371 Date: Feb. 2, 1998

§ 102(e) Date: Feb. 2, 1998

(87) PCT Pub. No.: WO97/46888

PCT Pub. Date: Dec. 11, 1997

(30) Foreign Application Priority Data

Jun. 5, 1996 (JP) .................................... 8-143028

(51) Int. Cl.[7] ............................................... G01P 15/08
(52) U.S. Cl. .................................. 463/36; 463/1; 463/8; 273/148 R; 273/148 B
(58) Field of Search .................................. 463/1, 7, 8, 6, 463/30–39, 53; 273/444, 459, 460; 473/212, 213, 221; 482/44–46, 83, 84, 110, 148; 73/137, 488, 491, 492, 510, 514.01

(56) References Cited

U.S. PATENT DOCUMENTS

| 4,491,324 | * | 1/1985 | yoshida | 463/8 |
| 4,699,379 | | 10/1987 | Chateau et al. | |
| 4,967,596 | | 11/1990 | Rilling et al. | |
| 4,991,850 | * | 2/1991 | wilhlem | 273/186 |
| 5,229,756 | | 7/1993 | Kosugi et al. | |
| 5,288,078 | * | 2/1994 | capper et al. | 273/148 B |
| 5,329,276 | * | 7/1994 | Hirabayashi | 273/438 |
| 5,354,057 | | 10/1994 | Pruitt et al. | |
| 5,362,069 | * | 11/1994 | Hall-Tipping | 463/30 |
| 5,414,256 | * | 5/1995 | gurner | 250/211 |
| 5,488,362 | * | 1/1996 | ullman | 341/20 |
| 5,516,105 | | 5/1996 | Eisenbrey et al. | |
| 5,524,637 | * | 6/1996 | Erickson | 128/779 |
| 5,592,401 | * | 1/1997 | Kramer | 463/49 |
| 5,615,132 | * | 3/1997 | horton | 364/516 |
| 5,646,345 | * | 7/1997 | butler, Jr. | 73/492 |
| 5,723,786 | * | 3/1998 | Klapman | 73/379.04 |
| 5,741,182 | * | 4/1998 | lipps et al. | 463/36 |
| 5,745,028 | * | 4/1998 | hock | 340/323 |
| 5,751,273 | * | 5/1998 | cohen | 345/156 |
| 5,833,549 | * | 11/1998 | zur et al. | 473/199 |

FOREIGN PATENT DOCUMENTS

| 38 42 434 A1 | 12/1989 | (DE) . |
| 2 194 338 | 3/1988 | (GB) . |
| WO 91/06348 | 5/1991 | (WO) . |

\* cited by examiner

*Primary Examiner*—Valencia Martin-Wallace
*Assistant Examiner*—John M Hotaling, II
(74) *Attorney, Agent, or Firm*—Frishauf, Holtz, Goodman, Langer & Chick, P.C.

(57) ABSTRACT

A movement measuring device determines the speed of the body's specific movement on the basis of the maximum value of the acceleration sensed by an acceleration sensing unit attached to the body, when the body has made a specific movement. For example, when the player wears the device on his arm and makes a punching motion, the punching speed is found from the maximum acceleration resulting from the punching action. Furthermore, a game device obtains data indicating the magnitude of a specific movement of the body, on the basis of the acceleration sensed by an acceleration sensing unit, and then decides the outcome of the game on the basis of the strength and weakness of the punch. This enables the user to easily play a fighting sport game involving the player's actual punching motions anywhere.

41 Claims, 16 Drawing Sheets

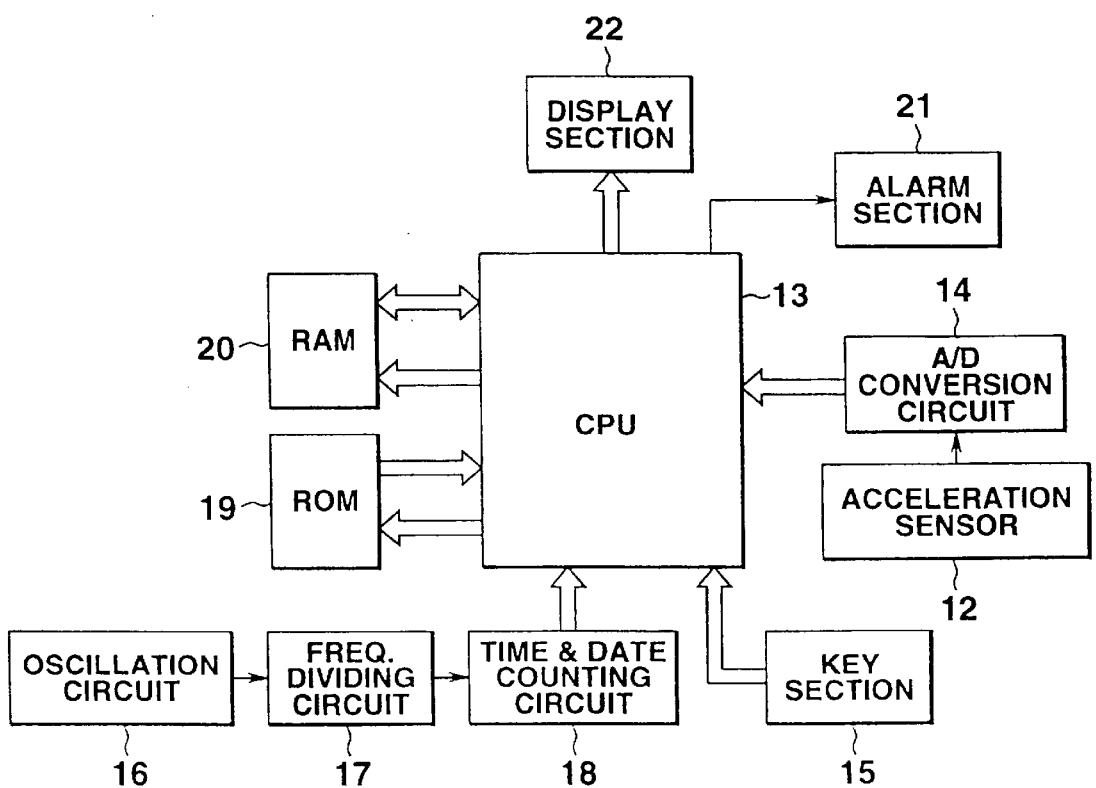

FIG.5

| WORLD RANKING | K VALUE |
|---|---|
| CHAMP TO 10TH RANK | 0.006 |
| 11TH TO 20TH RANKS | 0.007 |
| 21TH TO 30TH RANKS | 0.020 |

NOTE: K IS A COEFFICIENT INCLUDING WORLD RANK AND SPECIFIC WEIGHT

FIG.6

| DEFENCE SPEED \ WORLD RANK | CHAMP TO 10TH RANK | 11TH TO 20TH RANKS | 21TH TO 30TH RANKS |
|---|---|---|---|
| 12 OR MORE | -5 | 0 | 0 |
| 6~11 | -10 | -5 | -5 |
| 0~5 | -20 | -15 | -10 |

FIG.7A

⟨VICTORY RANK POINTS⟩

| VICTORY PATTERN | RANKS UP |
|---|---|
| 1ST ROUND KO | +5 |
| 2ND ROUND KO | +3 |
| 3RD ROUND KO | +2 |
| REMAINING STAMINA JUDGMENT | +1 |

FIG.7B

⟨DEFEAT RANK POINTS⟩

| DEFEAT PATTERN | RANKS UP |
|---|---|
| 1ST ROUND KO | -5 |
| 2ND ROUND KO | -3 |
| 3RD ROUND KO | -2 |
| REMAINING STAMINA JUDGMENT | -1 |

MOVEMENT MEASURING DEVICE, ELECTRONIC GAME MACHINE INCLUDING MOVEMENT MEASURING DEVICE, AND METHOD OF PLAYING GAME MACHINE

TECHNICAL FIELD

This invention relates to a movement measuring device for easily measuring the momentum caused by the movement of the human body, an electronic game machine including the movement measuring device, and a method of playing the game machine.

BACKGROUND ART

A large variety of electronic game machines have come into being. Recently, fighting sport game products have appeared on the market.

For instance, in a computer video game using a display screen, a human character appearing on the screen is moved by the key operation of the controller to represent various actions, including punching and kicking, so that the character may fight with another human character manipulated by the computer-side or the opponent's controller. In this case, the player forcing the human character to make a fight has only to operate the controller's keys, so there is a big gap between the computer video game and actual combative sports, which dampens the pleasure of playing the game.

There has been a game machine, with which a player competes with the opponent for destructive power. Such a game machine senses the impact force exerted on the target that the player punches, for example. In this case, an object to be punched, serving as the target, is needed. Moreover, to sense the impact force exerted on the target, a large, complicated sensing device is required. For these reasons, game machines of this type have the problem of being suitable only for use in amusement arcades.

Accordingly, there has been no means for easily sensing the impact force corresponding to the movement of the body with a compact structure and it has been impossible to construct a game machine that enables the player to easily play a fighting sport game involving actual fighting actions anywhere.

DISCLOSURE OF INVENTION

A first object of the present invention is to provide a movement measuring device capable of easily sensing the speed and impact force of the action of an actual human body with a compact structure without requiring an object serving as a target.

A second object of the present invention is to provide an electronic game machine including a movement measuring device which enables the player to play a fighting sport game involving actual fighting actions of the player anywhere.

A movement measuring device of the present invention comprises: an acceleration sensor that is worn on the body and senses the acceleration of the body's movement; a maximum acceleration sensing section for sensing the maximum value of the acceleration sensed by the acceleration sensor in the course of a specific movement of the body; an input section for inputting a weight, and an impact computing section for determining an impact power produced by the specific movement of the body on the basis of the inputted weight and the maximum value of the acceleration sensed by the maximum acceleration sensing section. For example, when a player with the moving measuring device on his arm punches, the acceleration produced by the punching action is sensed by the acceleration sensing means and the maximum acceleration is sensed by the maximum acceleration sensor. The speed computing section then determines the impact power from the maximum acceleration and the inputted weight.

A game machine of the present invention comprises: an acceleration sensor that is worn on the body and senses the acceleration of the body's movement; a computing section for producing data indicating the magnitude of a specific movement on the basis of the acceleration sensed by the acceleration sensor; and decision means for determining victory or defeat on the basis of the data indicating the magnitude of the specific movement of the body produced by the computing section. For example, when a player with the game machine on his arm punches, victory or defeat is determined by the strength and weakness of the punch. This enables the player to easily play a fighting sport game involving actual fighting actions anywhere.

BRIEF DESCRIPTION OF THE DRAWINGS

FIG. 3 is a block diagram of the electronic circuit of the wristwatch device in FIG. 1;

FIG. 4 shows the structure of the individual registers for power measurement mode and game mode provided in the RAM of the electronic circuit of FIG. 3;

FIG. 5 is a K value setting table according to world ranking which is referred to when offensive strength A is determined in the game mode;

FIG. 6 is a defense capacity setting table referred to when defense capacity D is determined in the game mode;

FIGS. 7A and 7B are ranking update tables referred to when the number of places up or down in world ranking according to the victory or defeat pattern in the game mode is determined--FIG. 7A is a number-of-ranks-up setting table according to the victory pattern and FIG. 7B is a number-of-ranks-down setting table according to the defeat pattern;

BEST MODE OF CARRYING OUT THE INVENTION

(1) First Embodiment

A first embodiment of the present invention will be explained by reference to FIGS. 1 to 16.

Figure 1A:
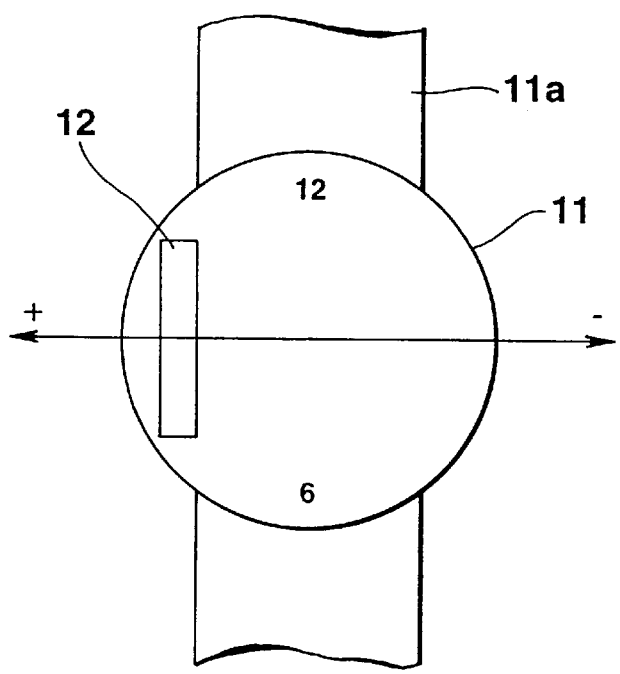
FIG. 1A is a front view of a wristwatch device according to a first embodiment of an electronic game machine including a movement measuring device of the present invention.
Figure 1B:
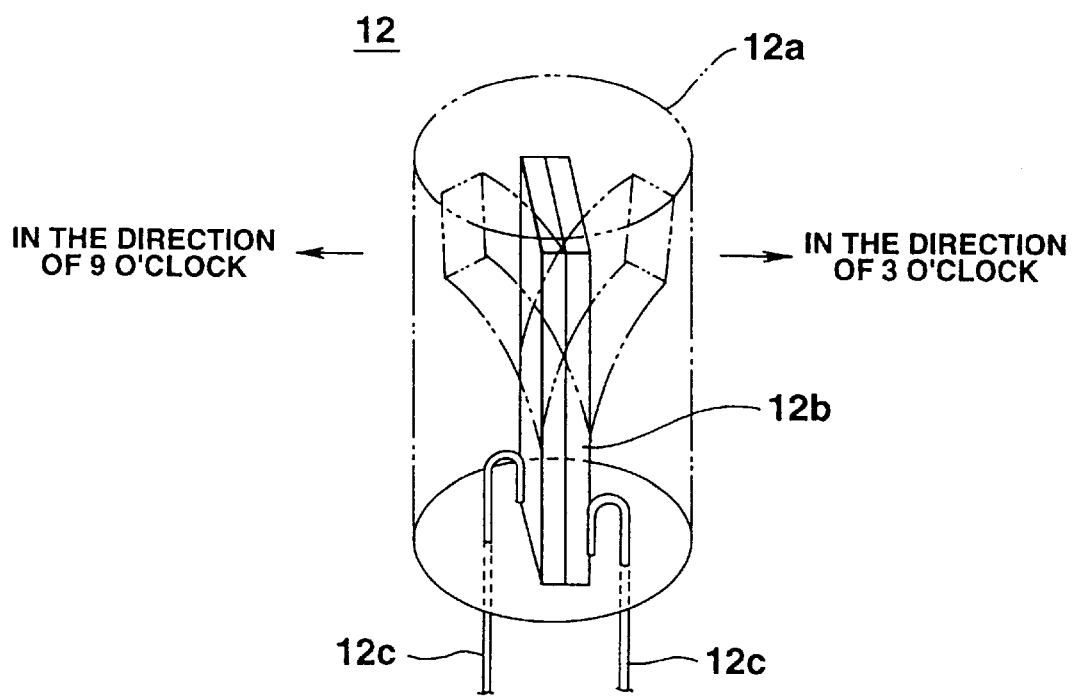
FIG. 1B illustrates an acceleration sensor.

FIG. 1A is a front view of a wristwatch device according to a first embodiment of an electronic game machine including a movement measuring device of the present invention. FIG. 1B illustrates an acceleration sensor.

A watch body 11 is as large as the ordinary wristwatch and can be worn around the wrist or the ankle with a wristband 11a. Inside the watch body 11, there are provided an acceleration sensor 12 and an electronic circuit that supervises various watch functions.

The acceleration sensor 12 is such that, for example, a two-ply rectangular plate-like piezoelectric element 12b is housed in a cylindrical case 12a, both sides of the bottom of the piezoelectric element 12b being connected to two lead wires 12c, as shown in FIG. 1B. The sensor senses acceleration by receiving the voltage generated as a result of the bending of the piezoelectric element 12b in vibration.

The acceleration sensor 12 is placed so as to correspond to the nine o'clock position on the watch body 11. The sensor is set in the direction in which a positive voltage is sensed in proportion to the acceleration at which the watch body 11 moves in the direction of nine o'clock and in which a negative voltage is sensed in proportion to the acceleration at which the watch body moves in the direction of three o'clock.

Figure 2:
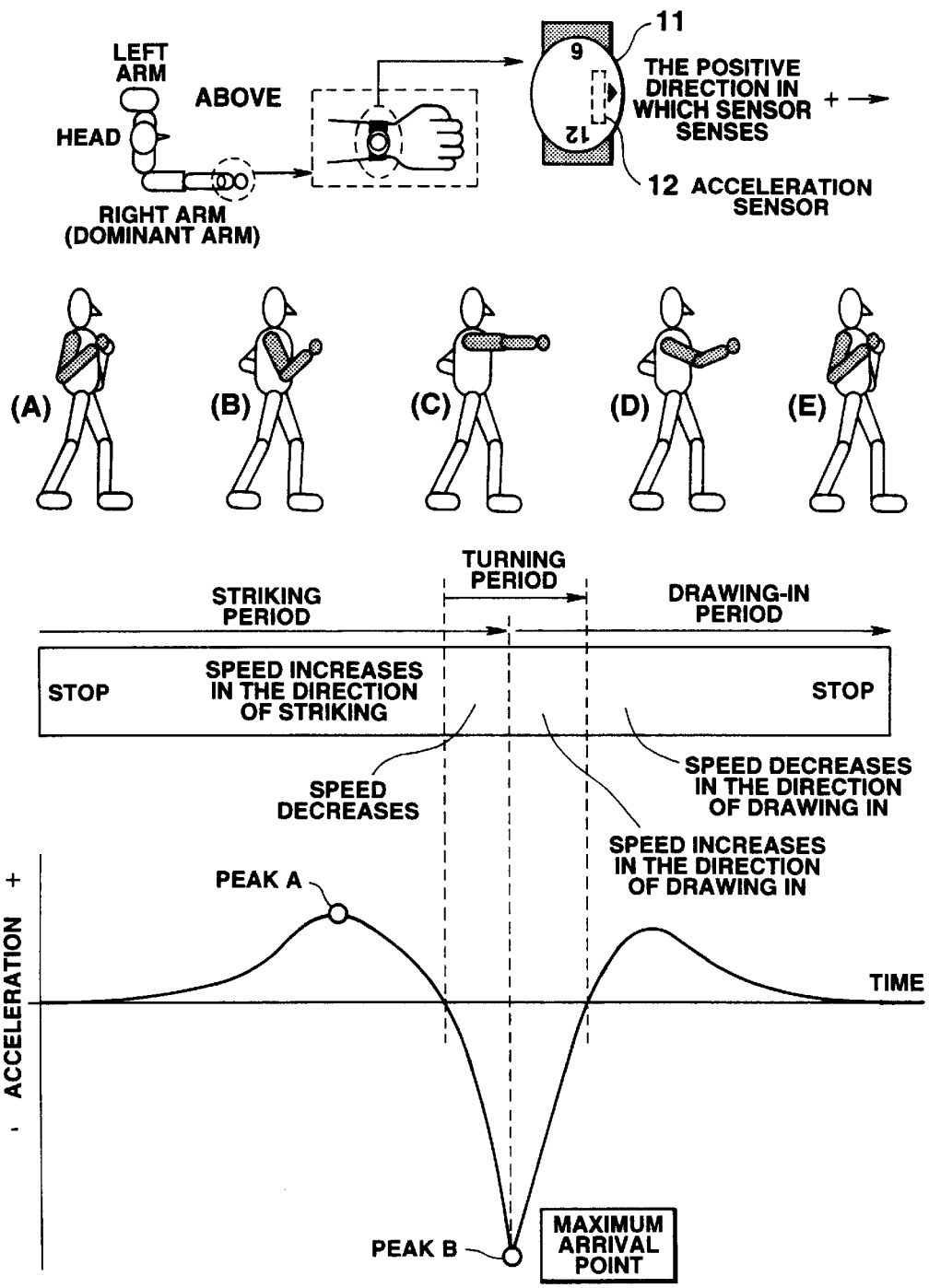
FIG. 2 shows how the acceleration sensor senses the acceleration caused by the movement of a person wearing the wristwatch device of FIG. 1.

FIG. 2 shows how the acceleration sensor senses 15 the acceleration caused by the movement of a player wearing the wristwatch device.

For example, the player puts the wristwatch body 11 on his right arm, his dominant arm. When he punches as shown by (A) to (E) in FIG. 2, the voltage generated by the acceleration sensor 12 is as follows: in the striking period corresponding to (A) to (C), a positive voltage proportional to an increase in the speed in the direction of striking is sensed, and at the turning point where the punching arm has stretched out completely, the maximum negative peak voltage is sensed.

Since the maximum speed of the punch in the punching action is almost linearly proportional to the acceleration peak value B sensed by the acceleration sensor 12, the maximum speed of the punch is determined by multiplying the acceleration peak value B by a constant taking into account the inclination of the proportional straight line.

FIG. 3 is a block diagram of the electronic circuit of the wristwatch device.

The electronic circuit of the wristwatch device is provided with a CPU 13.

According to each of the acceleration data inputted from the acceleration sensor 12 via an A/D conversion circuit 14, the key operation signal inputted from a key section 15, and the time and date count data inputted from an oscillation circuit 16 via a frequency dividing circuit 17 and a time and date counting circuit 18, the CPU 13 starts the system program previously stored in a ROM 19 and controls the operation of each circuit according to the system program.

Connected to the CPU 13 are not only the A/D conversion circuit 14, key section 15, time and date counting circuit 18, and ROM 19 but also a RAM 20, an alarm section 21, and a display section 22.

The A/D conversion circuit 14 converts the voltage signal corresponding to the sensed acceleration outputted from the acceleration sensor 12 into digital data and sends the digital data to the CPU 13. In this case, the A/D conversion circuit 14 converts the voltage signal corresponding to an acceleration of −60 G to +60 G sensed by the acceleration sensor 12 into the digital data ranging from −128 to +128 and sends the digital data to the CPU 13.

The key section 15 is provided with S1 key, S2 key, S3 key, FO key, and SM key that are operated when various functions are executed in the various modes, including the basic watch mode, power measurement mode, and game mode in the wristwatch device.

Specifically, in the basic watch mode, for example, the present date and time data items corresponding to the time and date counting data inputted from the time and date counting circuit 18 appear on the display section 22. In the power measurement mode, for example, on the basis of the acceleration data sensed by the acceleration sensor 12 as a result of the punching action of the player, the punch speed and the destructive power of the punch (impact force) are measured and displayed. In the game mode, for example, on the basis of the acceleration data sensed by the acceleration sensor 12 as a result of the punching action of the player, the offensive strength and defense capacity against the imaginary opponent is determined and victory or defeat is judged. Then, the judgment result is displayed.

The ROM 19 stores not only the system program that supervises the overall control of the electronic circuit but also a subprogram that supervises control corresponding to the various operation modes, including the basic watch mode, power measurement mode, and game mode, and the preset table data items.

FIG. 4 shows the structure of the individual registers for the power measuring mode and game mode provided in the RAM 20 of the electronic circuit in the wristwatch device.

The measurement-mode registers in the RAM 20 include, for example, a first measurement register 20a, a second measurement register 20b, and a third measurement register 20c that store the punching speed and the destructive power (impact force) of the punch measured on the basis of the acceleration data sensed by the acceleration sensor 12 as a result of the punching action of the player, as a first measured value, a second measured value, and a third measured value, respectively. The measurement-mode registers further include a maximum value register 20d that stores the maximum punching speed and maximum punch destructive power among the values of power measured until that time and a weight register 20e and a dominant arm register 20f in which the player's weight and the dominant arm wearing the wristwatch device are set respectively.

The punching speed V in the punching action of the player is determined using equation 1. The punch destructive power (impact force) P is found using equation 2.

Specifically, if the maximum value of the acceleration data items obtained from the acceleration sensor 12 via the A/D conversion circuit 14 is C and the player's weight is W, the punching speed V will be:

$$V=0.8\times|C| \text{ (the figures in one decimal place or below are rounded off)} \quad [1]$$

For example, if the acceleration data obtained from the A/D conversion circuit 14 as a result of the punching action of the player indicates "54" (an acceleration of about 25 G), the punching speed V will be:

$$V=0.8\times54=43.2=43$$

The punch destructive power (impact force) P will be:

$$P=0.003\times W\times V^2 \text{ (the figures in one decimal place or below are rounded off)} \quad [2]$$

For example, in the case where the punching speed V obtained on the basis of an acceleration data item of "54" (an acceleration of about 25 G) as a result of the punching action of the player is "43" and the player's weight W is 35 Kg, the punch destructive power (impact force) P will be:

$$P=0.003\times35\times43\times43=194.145=194$$

The game-mode registers in the RAM 20 include a player's own stamina register 20g into which the result of subtracting a value corresponding to the defense capacity D (damage) in the present round from a stamina of, for example, 50 points given to the player at the start of the game is stored, an opponent's stamina register 20h into which the result of subtracting a value corresponding to the offensive strength A in the present round from a stamina of 50 points given to the imaginary opponent at the start of the game is stored, a world rank register 20i into which the player's world rank, going up and down in the 30 world ranks depending on the victory or defeat pattern determined by the player's own stamina and the opponent's stamina at the end of the round, is stored, a number-of-wins-and-defeats register 20j into which the number of wins and defeats up to now is stored, and a number-of-KO-wins-and-defeats register 20k into which the number of KO wins and defeats up to now is stored.

The offensive strength A that causes the opponent to consume his stamina is determined using equation 3.

Specifically, if the punch destructive power is P, the punching speed is V, and the world ranking coefficient is R, the offensive strength A will be:

$$A=P\times R \text{ (the figures in one decimal place or below are rounded off)}=K\times V^2 \quad [3]$$

K is a coefficient taking into account a specific weight preset according to the player's world rank. Namely, the offensive strength A is found using the punching speed V obtained from equation 1 as a result of the punching action of the player and the coefficient K corresponding to the player's world rank at present.

FIG. 5 is a K value setting table according to world ranking which is referred to when offensive strength A is determined in the game mode of the wristwatch device.

The K value setting table according to world ranking is stored in advance in the ROM 19, for example.

For example, if the acceleration data obtained from the A/D conversion circuit 14 as a result of the punching action of the player indicates "54" (an acceleration of about 25 G) and the player's world rank at present is the twelfth rank, offensive strength A will be:

$$V=0.8\times54=43.2=43$$

$$A=0.007\times43\times43=12.943=12$$

The defense capacity D (damage) that suppresses the consumption of the player's stamina caused by the attack of the imaginary opponent is determined according to the player's world rank at present and the defensive punching speed V.

FIG. 6 is a defense capacity setting table referred to when defense capacity D is determined in the game mode of the wristwatch device.

The defense capacity setting table is stored in advance in the ROM 19, for example.

In this case, if the defensive punching speed V does not increase as the player's world rank at present gets higher, the defense capacity D will decrease and a value subtracted from the player's own stamina will become larger.

For example, if the acceleration data obtained from the A/D conversion circuit 14 as a result of the defensive punching action of the player indicates "21" (an acceleration of about 10 G) and the player's world rank at present is the twelfth rank, the defense capacity D will be:

$$V=0.8\times21=16.8=16$$

Thus, from the defense capacity setting table (see FIG. 6), it is found that defense capacity D=0.

FIGS. 7A and 7B are ranking update tables referred to when the number of places up or down in world ranking according to the victory or defeat pattern in the game mode of the wristwatch device is determined—FIG. 7A is a number-of-ranks-up setting table according to the victory pattern and FIG. 7B is a number-of-ranks-down setting table according to the defeat pattern.

Both of the rank-up table and rank-down table are stored in the ROM 19 beforehand.

In this case, the highest place in world ranking is a champion. It is assumed that the champion is not exceeded no matter how many ranks are left for the player to go up.

For example, when the player has knocked out the opponent in the second round in the fighting sport game, his rank goes up three places in world ranking. When the player has won as a result of a comparison of the number of stamina points at the end of the round, his rank goes up one place and the contents of the world rank register 20i is updated.

On the other hand, for example, when the player has been knocked out in the second round of the fighting sport game, his rank goes down three places in world ranking. When the player has been defeated as a result of a comparison of the number of stamina points at the end of the round, his rank goes down one place and the contents of the world rank register 20i is updated.

Figure 8:
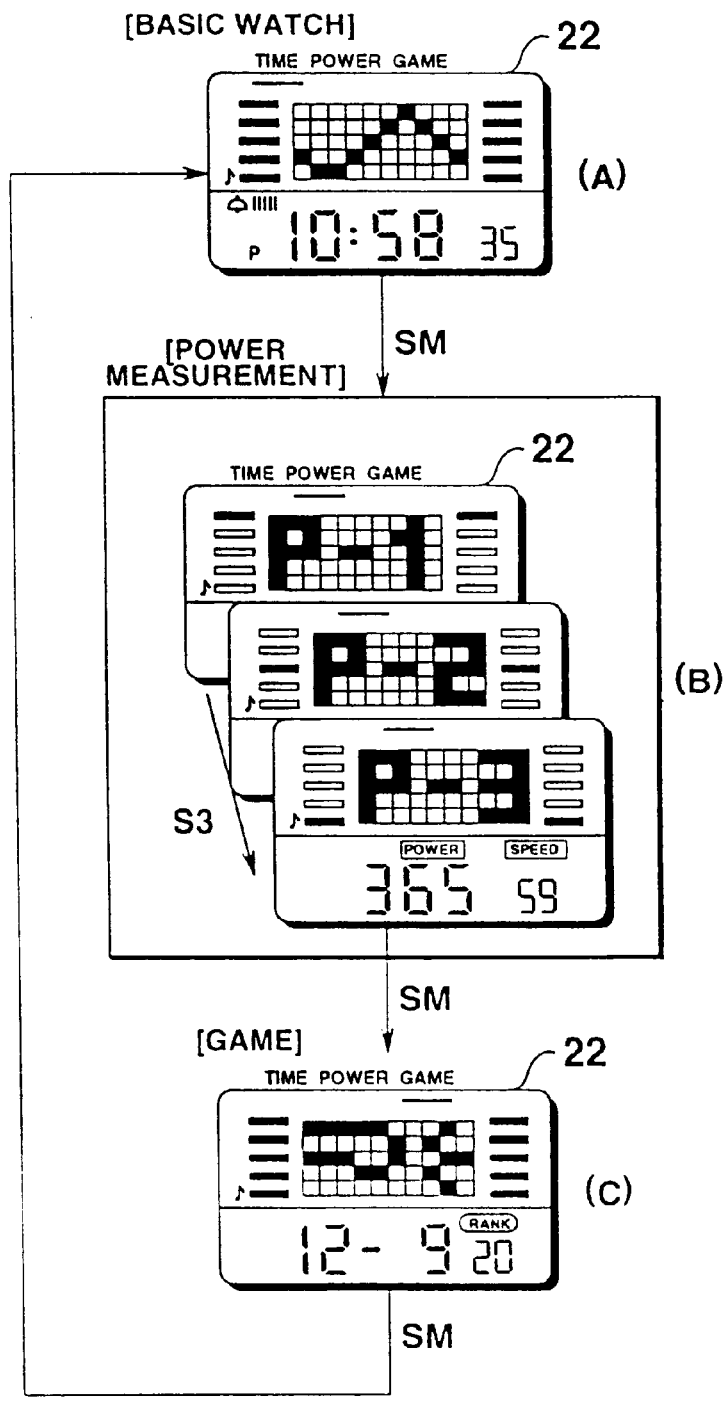
FIG. 8 is views of the initial screens corresponding to the individual operation modes.

FIG. 8 is views of the initial screens corresponding to the individual operation modes of the wristwatch device. Illustration (A) in FIG. 8 is a view of the initial screen in the basic watch mode. Illustration (B) in FIG. 8 is a view of the initial screen in the power measurement mode. Illustration (C) in FIG. 8 is a view of the initial screen in the game mode.

Each time the SM key provided in the key section 15 is operated, the operation modes of the wristwatch device are switched in this order: the basic watch mode → the power measurement mode → the game mode → the basic watch mode. As shown in illustration (A) in FIG. 8, on the initial screen in the basic watch mode, the present time appears in the lower display area of the display section 22 according to the date and time data obtained from the time and date counting circuit 18.

As shown in illustration (B) in FIG. 8, on the initial screen in the power measurement mode, each time the S3 key provided in the key section 15 is operated, the measurement numbers indicating a first, second, and third measurement modes appear in the upper display area of the display section 22 and are switched in this order: P-1, P-2, and P-3. In the lower display area, the punch destructive power (POWER) and punching speed (SPEED) measured in the preceding session in each measurement mode appear.

As shown in illustration (C) in FIG. 8, on the initial screen in the game mode, a punching game image with the stamina level of the player (left) and that of the opponent (right) appear in the upper display area of the display section 22. In the lower display area, the player's record against the opponent and his world rank (RANK) at present appear.

Next, the power measurement operation of the wristwatch device thus constructed will be explained.

Figure 9:
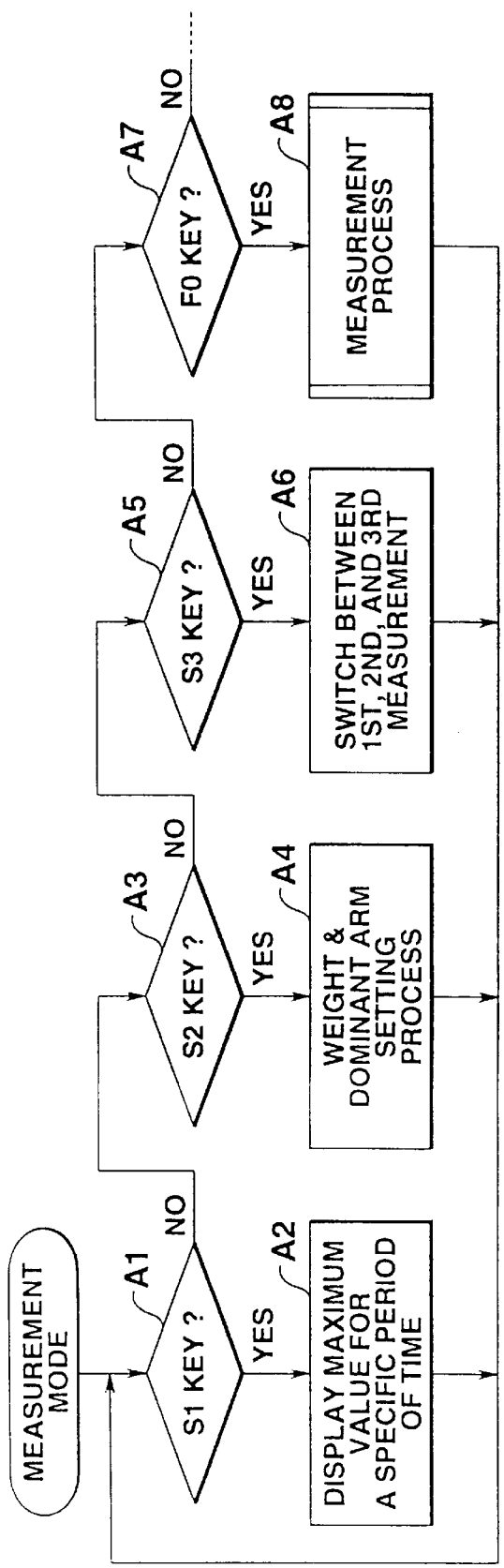
FIG. 9 is a flowchart of the measurement mode process in the power measurement mode of the wristwatch device of FIG. 1.

FIG. 9 is a flowchart of the measurement mode process in the power measurement mode of the wristwatch device.

Figure 10:
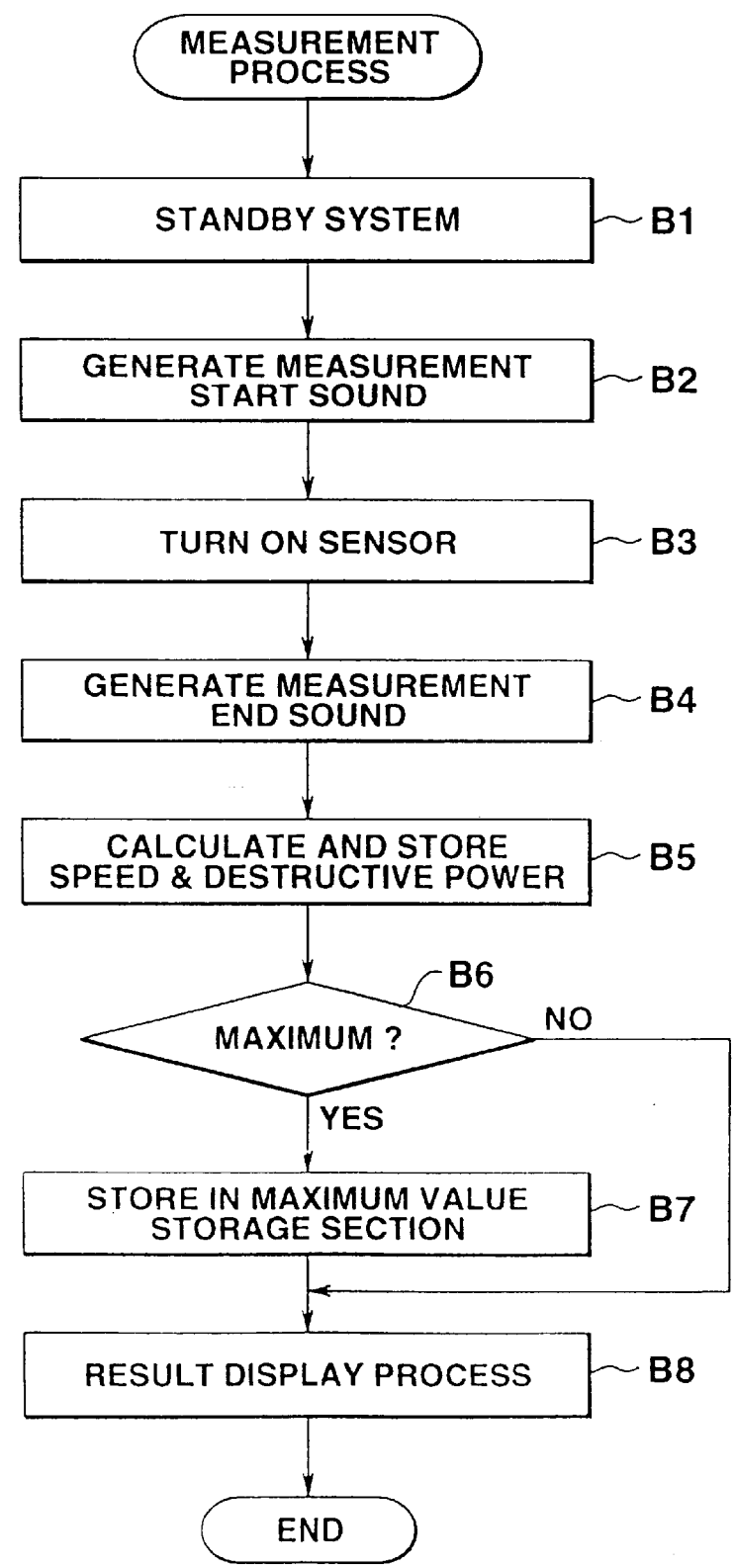
FIG. 10 is a flowchart of the measurement process in the measurement mode process in the power measurement mode.

FIG. 10 is a flowchart of the measurement process in the measurement process in the power measurement mode of the wristwatch device.

Figure 11:
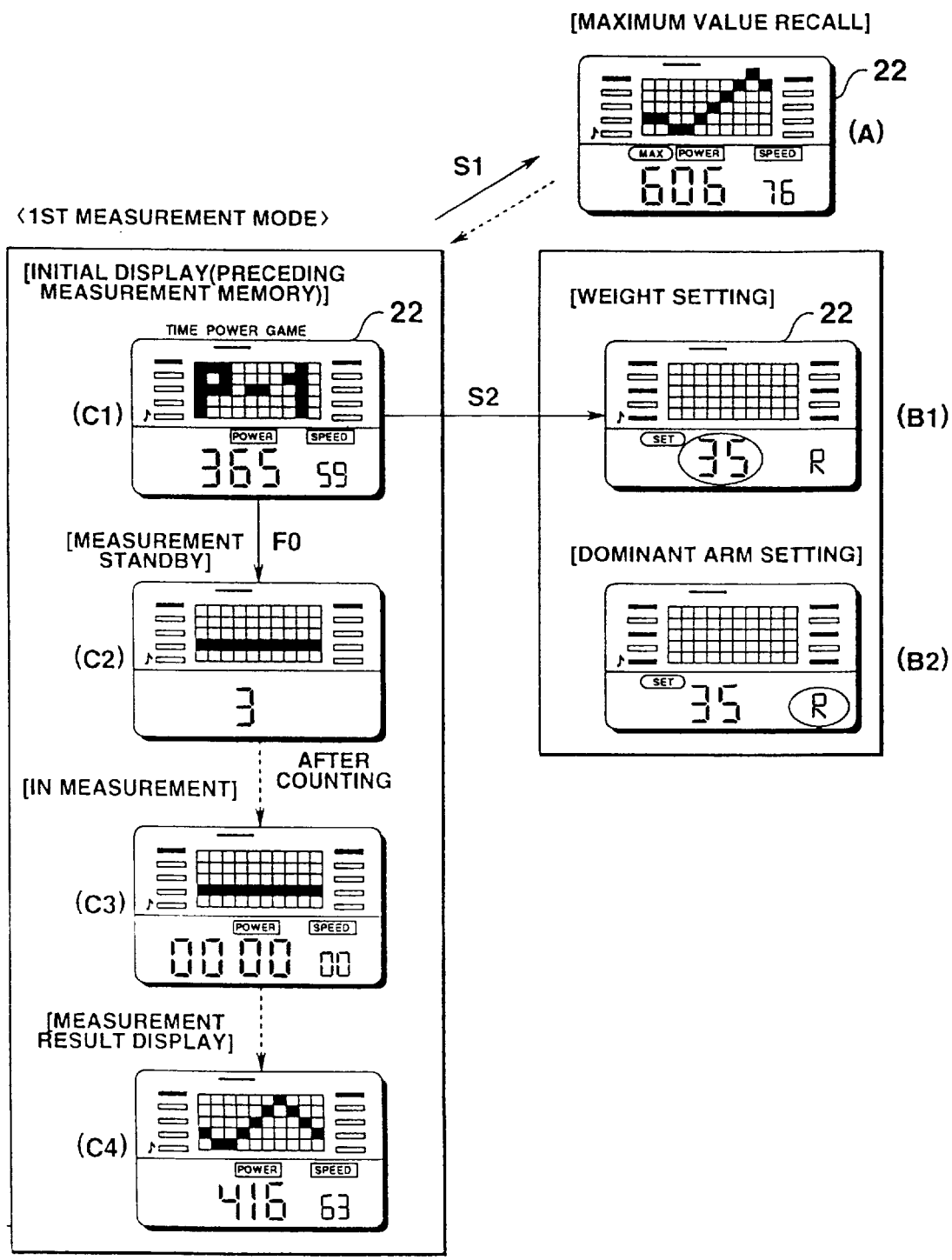
FIG. 11 illustrates display operations in the measurement mode process in the power measurement mode.

FIG. 11 illustrates display operations in the measurement mode process in the power measurement mode of the wristwatch device.

Figure 12:
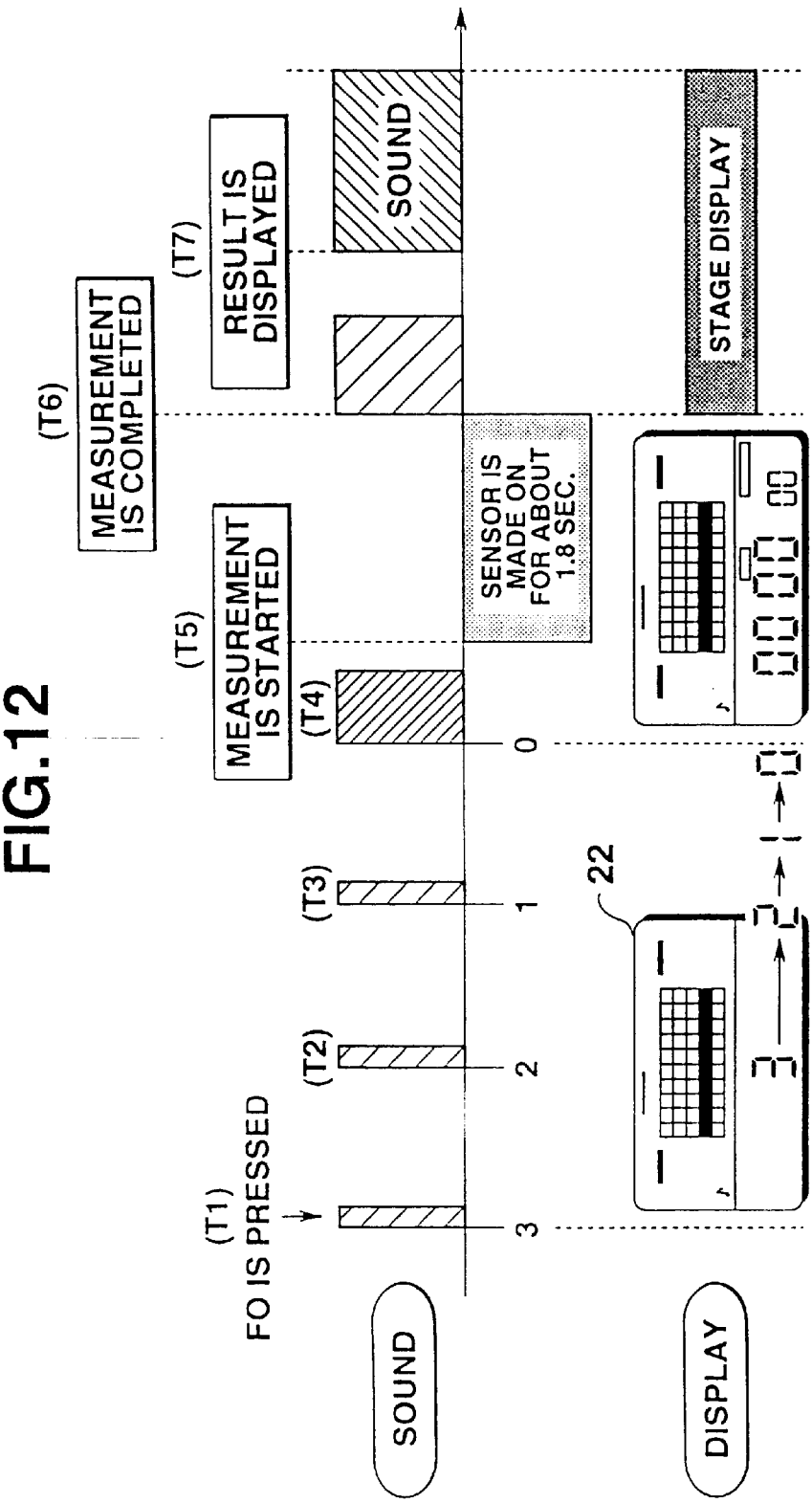
FIG. 12 is a timing chart for changes in the sound and representation in the measurement process in the power measurement mode.

FIG. 12 is a timing chart for changes in the sound and representation in the measurement process in the power measurement mode of the wristwatch device.

When the SM key in the key section 15 is operated, the power measurement mode process of FIG. 9 is started. With the initial screen on which the measurement number P-1 indicating the first measurement mode appears in the upper display area of the display section 22 as shown in illustration (C1) in FIG. 11 and the punch destructive power (POWER) and punching speed (SPEED) measured in the preceding session in the first measurement mode appears in the lower display area, when the S1 key in the key section 15 is operated, the screen is changed to the maximum value recall screen as shown in illustration (A) in FIG. 11. Then, the past maximum punch destructive power and punching speed (MAX. POWER/SPEED) stored in the maximum value register 20d of the RAM 20 are read out and forced to appear on the display section 22 for a specific period of time (step A1 → step A2).

With the initial screen in the power measurement mode as shown in illustration (C1) in FIG. 11, when the S2 key in the key section 15 is operated, the screen is changed to the player's weight and dominant arm setting screens as shown in illustrations (B1) and (B2) in FIG. 11. Depending on a combination of S1 key and S3 key, the player's weight or dominant arm are set and displayed and are stored in the weight register 20e and dominant arm register 20f in the RAM 20, respectively (step A3 → step A4).

With the initial screen in the power measurement mode as shown in illustration (C1) in FIG. 11, when the S3 key in the key section 15 is operated, each time the S3 key is operated, the measurement numbers indicating the first, second, and third measurement modes are switched and displayed in this order: P-1, P-2, and P-3 (step A5 → step A6).

Then, for example, with the first measurement mode in operation as shown in (C1) in FIG. 11, when the FO key in the key section 15 is operated, the measurement process of FIG. 10 is started (step A7 → step AB). This changes the screen to the measurement standby screen as shown in illustration (C2) in FIG. 11, which provides sound and display as a result of a countdown of three seconds with timing T1 to T3 as shown in FIG. 12 (step B1).

Then, when a measurement start sound is produced with timing T4 in FIG. 12, the screen is changed to the in-measurement screen as shown in illustration (C3) in FIG. 11. With timing T5, the acceleration sensor 12 is set to ON to sense the acceleration as a result of the punching action of the player. Then, the A/D converted acceleration data is supplied to the CPU 13 (steps B2, B3).

Then, with timing T5 of FIG. 12, a measurement end sound is produced. Then, the punching speed V is calculated using equation 1 on the basis of the maximum punch acceleration data C sensed by the acceleration sensor 12 via the A/D conversion circuit 14 as a result of the punching of the player. At the same time, the punch destructive power (impact force) P is calculated using equation 2 on the basis of the punching speed V and the first player's weight W stored in the weight register 20e in the RAM 20. The punching speed and the punch destructive power are stored in the first measurement register 20a in the RAM 20 (step B5).

Here, the punching speed V and punch destructive power P stored in the first measurement register 20a in the present power measurement are compared with the maximum punching speed Vmax and maximum punch destructive power Pmax stored in the maximum value register 20d in the RAM 20 to judge whether the former are the largest at that time (step B6).

For example, if it has been judged that the punching speed V and punch destructive power P of the first player in the present power measurement are the largest at that time, the punching speed V and punch destructive power P of the first player are stored in the maximum value register 20d in the RAM 20 as the maximum punching speed Vmax and maximum punch destructive power Pmax, thus updating the latter (step B6 → step B7).

Then, with timing T7 of FIG. 12, a measurement result sound is produced and simultaneously the screen is changed to the measurement result screen as shown in illustration C4 in FIG. 11, on which the punch destructive power (POWER) and punching speed (SPEED) of the first player stored in the first measurement register 20a in the RAM 20 appear (step B8).

Thereafter, when the power of a second player and that of a third player are measured, the operation of the S3 key in the key section 15 switches the measurement mode to the second measurement mode (P-2) or the third measurement mode (P-3). Then, by the same processes as described above, the punching speed V and punch destructive power P are calculated on the basis of the punch acceleration C of each player. The calculation results are stored in the second measurement register 20b or third measurement register 20c in the RAM 20.

Therefore, in the power measurement mode process in the wristwatch device thus constructed, when the player punches with the wristwatch device on his arm, the punching speed V is determined by simple calculations on the basis of the punch acceleration C sensed by the acceleration sensor 12. At the same time, the punch destructive power (impact force) P is determined by simple calculations on the basis of the punching speed V and the player's weight W. The punching speed and punch destructive power are forced to appear on the display section 22, which enables the player to measure the speed and destructive power (impact force) corresponding to the punching action of his own body with the compact configuration.

Next, the game operation of the wristwatch device having the above-described configuration will be explained.

Figure 13:
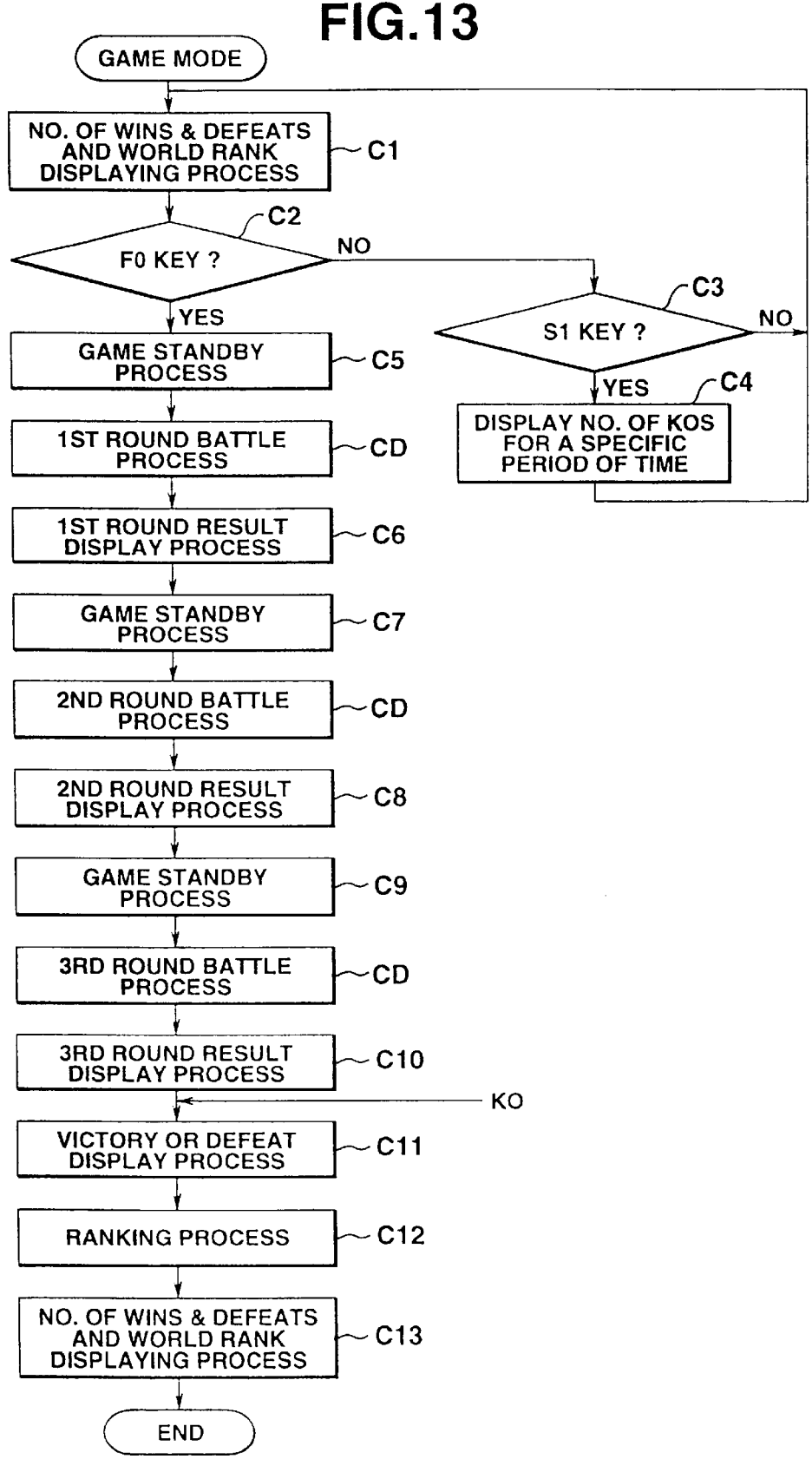
FIG. 13 is a flowchart for the game mode process in the punching game mode.

FIG. 13 is a flowchart for the game mode process in the punching game mode of the wristwatch device.

Figure 14:
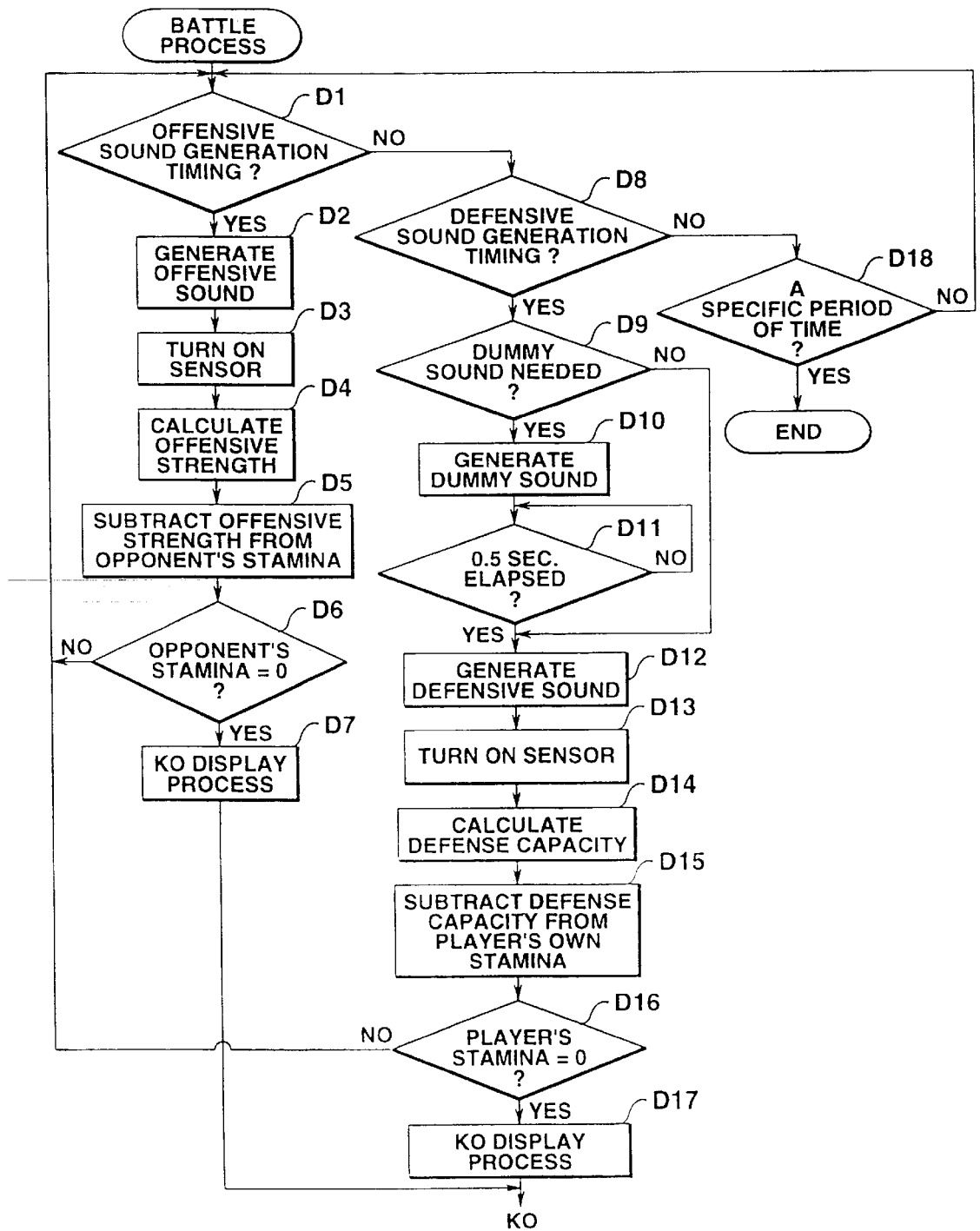
FIG. 14 is a flowchart of the battle process in the game mode process in the punching game mode of the wristwatch device.

FIG. 14 is a flowchart for the battle process in the game mode process in the punching game mode of the wristwatch device.

Figure 15:
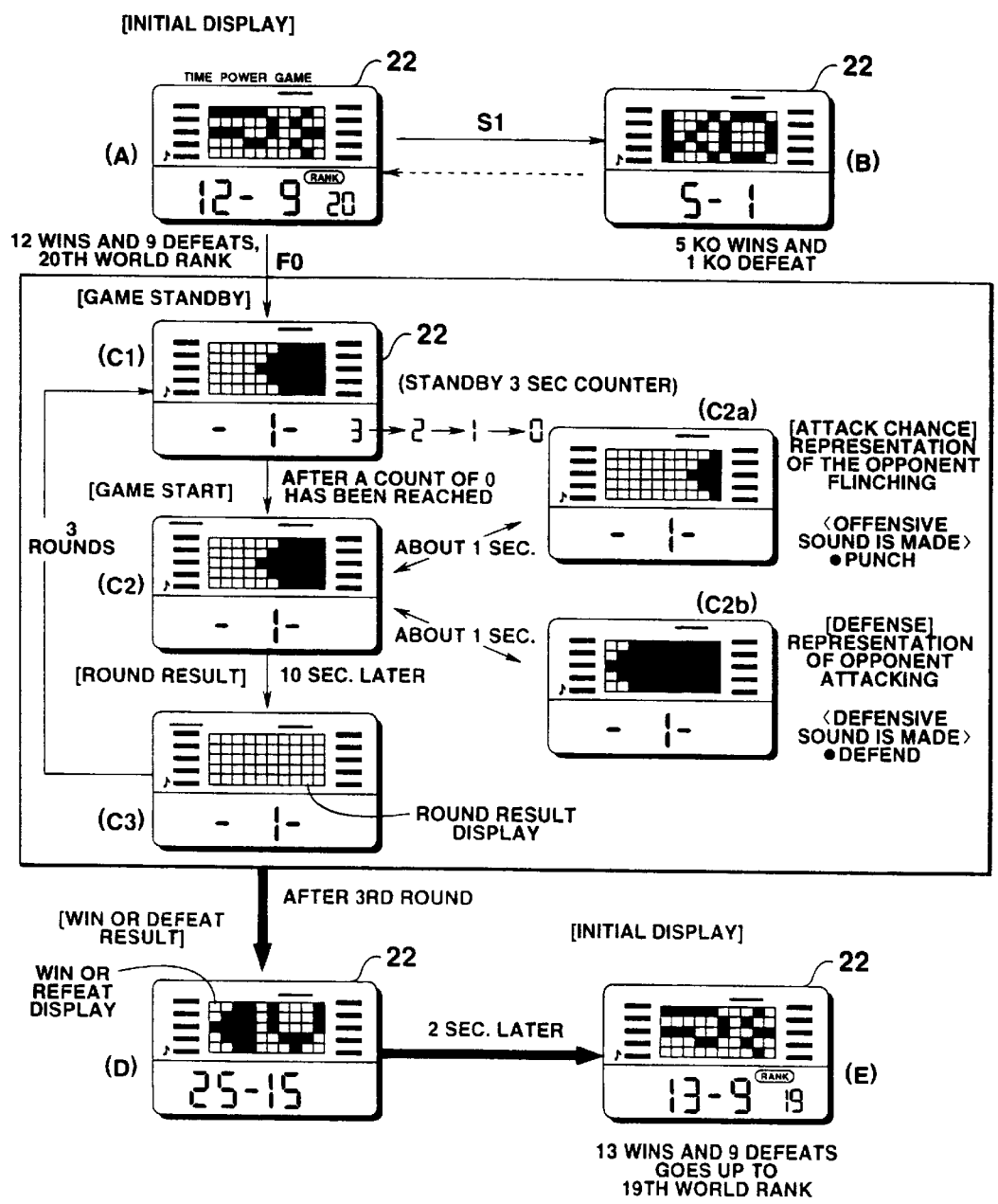
FIG. 15 shows display operations in the game mode process in the punching game mode.

FIG. 15 shows display operations in the game mode process in the punching game mode of the wristwatch device.

Figure 16:
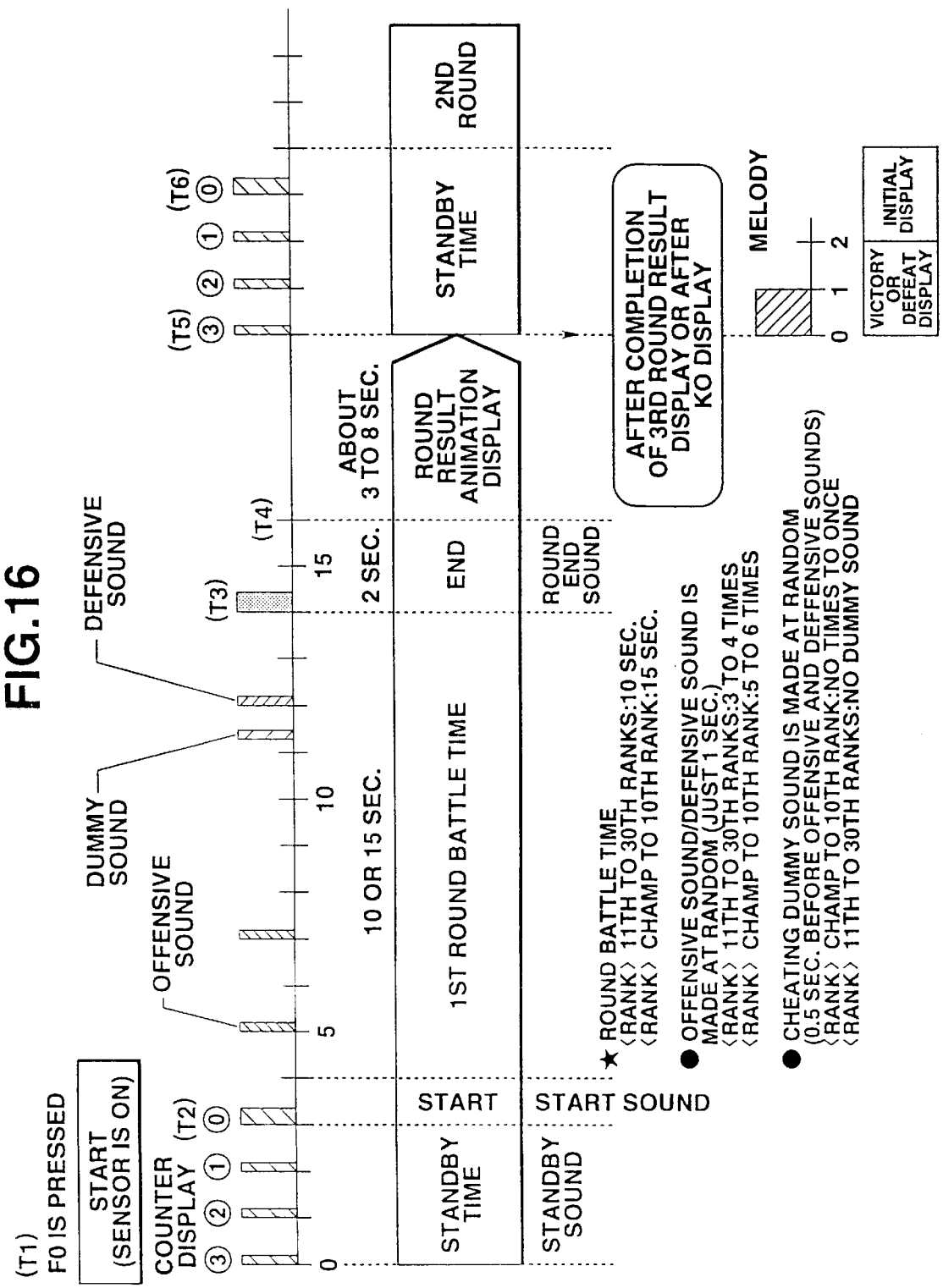
FIG. 16 is a timing chart to help explain the elapsed time in the game mode process in the punching game mode.

FIG. 16 is a timing chart to help explain the elapsed time in the game mode process in the punching game mode of the wristwatch device.

When the game mode process of FIG. 13 is started by the operation of the SM key in the key section 15, a punching game image, together with the stamina level (an initial value of 50 points) of the player (left) and the opponent (right) stored in the player's stamina register 20g and opponent stamina register 20h in the RAM 20 appears in the upper display area of the display section 22. In the lower display area, the player's record against the opponent and present world rank (RANK) stored in the number-of-wins-and-defeats register 20j and world rank register 20i in the RAM 20 appear (step C1).

With the initial screen in the game mode of illustration (A) in FIG. 15, when the S1 key in the key section 15 is operated, a "KO" image appears in the upper display area of the display section 22 for a specific period of time as shown in illustration (B1) in FIG. 15. At the same time, the number-of-past-KO-wins-and-defeats stored in the number-of-KO-wins-and-defeats register 20k in the RAM 20 is read out and displayed in the lower display area (step C2 → step C3 → step C4).

With the initial screen in the game mode of illustration (A) in FIG. 15, when the FO key in the key section 15 is operated, the screen is changed to the standby screen as shown in illustration (C1) in FIG. 15. In the middle of the lower display area of the display section 22, the present round mark "1" appears. At the same time, with timing T1 to T2 of FIG. 16, standby sound is produced as a result of a countdown of three seconds (step C2 to step C5).

After the countdown in the game standby process has ended with timing T2 of FIG. 16, the screen is changed to the game start screen as shown in illustration (C2) in FIG. 15 and the battle process (the first round) of FIG. 14 is started (step CD).

In the battle process, with timing T2 to T3 of FIG. 16, the battle time of the first round is set to ten seconds or fifteen seconds, depending on the player's present world rank stored in the world rank register 20i in the RAM 20. During the battle time of the first round, an offensive sound indicating the attacking timing of the player's punch, a defensive sound indicating the timing of protecting the player from the attack of the opponent, and a dummy sound meaning a feint against the opponent's attack are produced with random timing.

In this case, the number of generations of the offensive sound and defensive sound is set to three to six times, depending on the player's present world rank stored in the world rank register 20i in the RAM 20. The dummy sound is generated once or no times for the tenth world rank or higher immediately before the generation of the defensive sound.

Specifically, in the battle process of FIG. 14, for example, when an offensive sound is produced at the alarm section 21 with the timing of producing an offensive sound, the screen is changed to the attach chance screen as shown in illustration (C2a) in FIG. 15. At the same time, the acceleration sensor 12 is set to ON and senses the acceleration caused by the offensive punching action of the player. Then, the A/D converted acceleration data is supplied to the CPU 13 (step D1 → step D2 and step D3).

Then, the punching speed V is calculated using equation 1 on the basis of the maximum punch acceleration data C caused by the defensive punching action of the player sensed by the acceleration sensor 12 via the A/D conversion circuit 14. At the same time, the offensive strength A is calculated using equation 3, on the basis of the punching speed V and the coefficient K corresponding to the player's present world rank obtained from the data in the table (see FIG. 5) stored in the ROM 19. Then, the offensive strength A is subtracted from the opponent's stamina points stored in the opponent stamina register 20h in the RAM 20 (step D4 and step D5).

Here, it is judged whether or not the opponent's stamina points have reached "0." If it has been judged that they have not reached "0," control will be returned to the state where the timing of producing an offensive sound and a defensive sound is waited for. If it has been judged that they have reached "0," the process of displaying "KO WIN" on the display section 22 will be carried out and thereafter control will be passed to step C11 of FIG. 13, where the win or defeat display process will be executed (step D6 → step D7 → KO).

Furthermore, when the timing of generating a defensive sound has been reached, it is judged whether or not the generation of a dummy sound is necessary (step D8 → step D9). When the timing of generating a dummy sound has been reached, the alarm section 21 generates a dummy sound (step D9 → step D10) and 0.5 seconds later, a defensive sound is generated (step D11 → step D12).

The, as shown in illustration (C2b) in FIG. 15, the screen is changed to the defense screen. At the same time, the acceleration sensor 12 is set to ON to sense the acceleration caused by the player's defending action. Then, the A/D converted acceleration data is supplied to the CPU 13 (step D13).

Then, the defense speed V is calculated using equation 1 on the basis of the acceleration data C concerning the player's defending action sensed by the acceleration sensor 12 via the A/D conversion circuit 14. Thereafter, on the basis of the defense speed V and the table data (see FIG. 6) stored in the ROM 19, the defense capacity (the player's damage) D according to the player's present world rank is determined. Then, the defense capacity D is subtracted from the player's stamina points stored in the player's stamina register 20g in the RAM 20 (steps D14, D15).

Then, it is judged whether or not the player's stamina points have reduced to zero. If it has been judged that they have not reduced to zero, control will be returned to the state where the timing of generating an offensive sound and defensive sound is waited for. If it has been judged that they have reduced to zero, "KO DEFEAT" will be forced to appear on the display section 22 and thereafter control will be passed to the victory or defeat display process of step C11 in FIG. 13 (step D16 → step D17 → KO).

In the state where neither the player's stamina points stored in the player's stamina register 20g in the RAM 20 nor the opponent's stamina points stored in the opponent stamina register 20h are "0," when it has been judged that a specific period of time has elapsed with timing T3 of FIG. 16, the battle process in the first round is terminated (step D18 → END).

Then, with timing T4 of FIG. 16, control proceeds to the result display process in the first round as shown in illustration (C3) in FIG. 15, the player's remaining stamina points stored in the player's stamina register 20g in the RAM 20 and the opponent's remaining stamina points stored in the opponent stamina register 20h are displayed in level form (step C6) on the left and right scales.

After the game standby process, battle process, and result display process concerning the first round of the punching game have been completed through steps C5, CD (D1 to D18), and C6, the game standby process concerning the second round is started, followed by the battle process and the result display process, as described above (steps C7, CD, C8).

After the game standby process, battle process, and result display process concerning the second round have been completed, the game standby process concerning the third round is started, followed by the battle process and the result display process, as described above (steps C9, CD, C10).

Then, when the first to third rounds of the punching game have ended or when either the opponent's stamina points or the player's stamina points have reduced to zero and the result is a KO win or a KO defeat in one of the first to third rounds, the screen on the display section 22 is changed to the victory or defeat screen as shown in illustration (D) in FIG. 15, where the player's remaining stamina points stored in the player's stamina register 20g in the RAM 20 and the opponent's remaining stamina points stored in the opponent stamina register 20h are displayed in level form on the left-side and right-side scales in the upper display area. At the same time, in the lower display area, the player's and opponent's stamina points are displayed in numeric form and a winner image determined by the comparison of the remaining stamina points is displayed in the upper middle image display area (step C11).

Then, the number of wins and defeats stored in the number-of-wins-and-defeats register 20j in the RAM 20 is updated. Moreover, in the case of a KO win or defeat, the number of KO wins and defeats stored in the number-of-KO-wins-and-defeats register 20k is also updated.

Depending on whether the win or defeat result obtained in the win or defeat display process comes from a decision on remaining points or from a KO in one of the first to third round battle processes, the player's present world rank stored in the world rank register 20i in the RAM 20 goes up or down, thereby updating the player's rank (step C12).

Then, as shown in illustration (E) in FIG. 15, in the lower display area of the display section 22, the number of wins and defeats of the player after the game updated in the number-of-wins-and-defeats register in the RAM 20 and the player's world rank updated in the world rank register 20i appear (step C13).

With the game mode process in the wristwatch device having the aforementioned configuration, when the player punches and defends with the wristwatch device on his arm in response to an offensive sound and defensive sound produced at random at the alarm section 21, the offensive strength A is calculated during the punching action on the basis of the acceleration data sensed by the acceleration sensor 12 and the opponent's stamina points stored in the opponent stamina register 20h are reduced. During the defending action, the defense capacity (the player's damage) D is calculated and the player's stamina points stored in the player's stamina register 20g are reduced. The win or defeat result is displayed, depending on the amount of the player's and opponent's remaining stamina points, which enables the player to easily play a fighting sport game involving the actual punching action of the player anywhere.

(2) Second Embodiment

Hereinafter, a second embodiment of the present invention will be explained by reference to FIGS. 17 and 18. The same parts as those in the first embodiment will be indicated by the same reference symbols and explanation of them will not be given.

Figure 17:
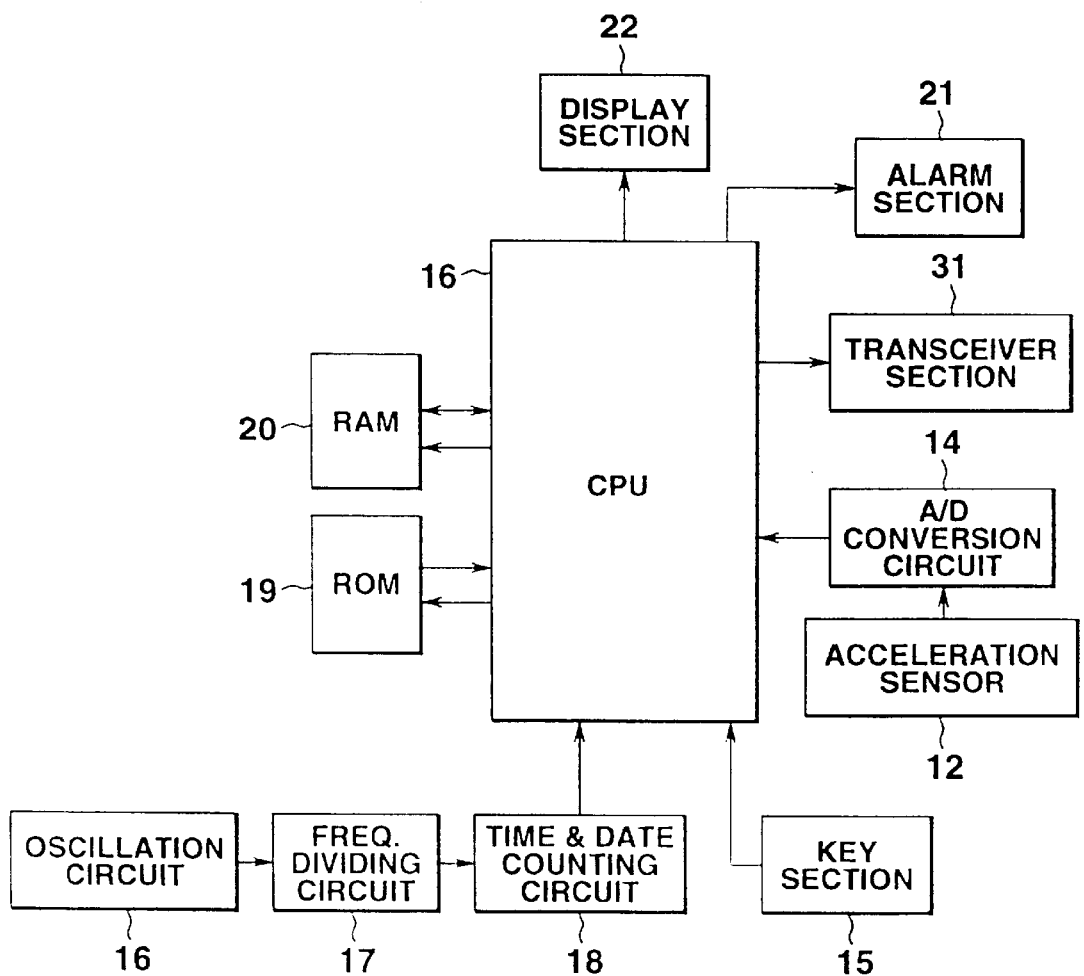
FIG. 17 is a block diagram of the circuit of an electronic wristwatch according to a second embodiment of the present invention.

FIG. 17 is a block diagram of the circuit of an electronic wristwatch according to a second embodiment of the present invention. The block diagram of FIG. 17 differs from that of FIG. 3 in that the former includes a transceiver section 31.

The transceiver section 31 transmits and receives data by infrared rays or by radio. It exchanges offensive strength data during an attack and defense capacity during defense with the opponent's game machine.

Next, the contents of the game process in the second embodiment will be described by reference to the flowchart of FIG. 18.

Figure 18:
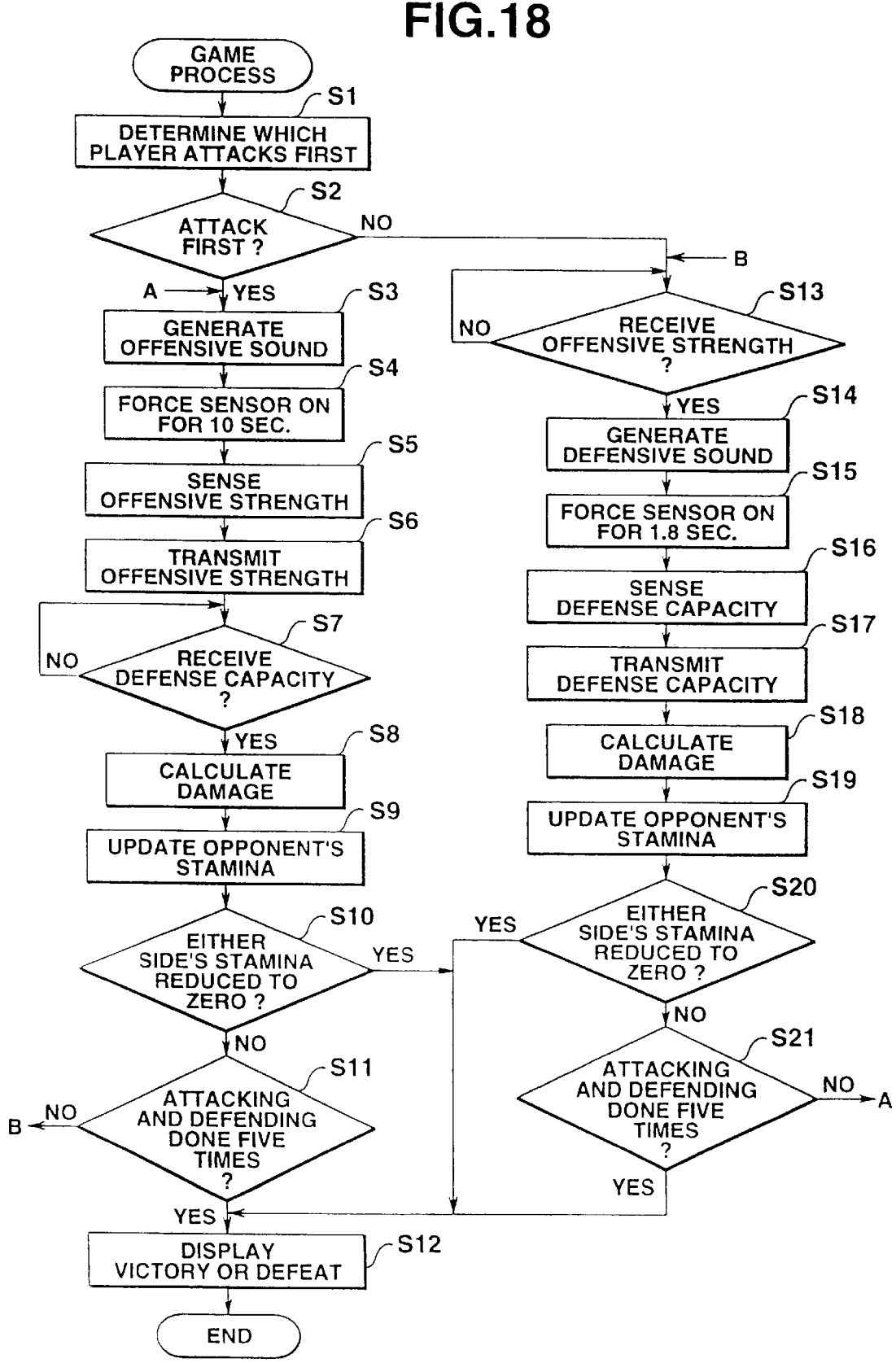
FIG. 18 is a flowchart for a game process.

At step S1 in FIG. 18, which of the two game machines attacks first is determined at random. At step S2, it is judged whether or not one player's game machine is allowed to attack first. If the player is allowed to attack first, an offensive sound will be produced at step S3 and then the acceleration will be sensed by the acceleration sensor 12 for ten seconds. The reason why the acceleration is sensed for ten seconds since the generation of the offensive sound is that the opponent player is allowed to determine offensive timing arbitrarily within the ten seconds.

At step S5, the offensive strength is sensed, that is, the maximum value of the acceleration sensed by the acceleration sensor 12 during ten seconds is found. Then, the offensive strength calculated at step S6 is sent to the transceiver section 31, which transmits it to the opponent game machine. At the following step S7, it is judged whether or not the defense capacity of the opponent has been received. Here, the defense capacity is the maximum value of the acceleration caused by the action of drawing in the arm. Because the direction of the acceleration caused by the action of drawing in the arm during defense is the opposite of the direction of the action of striking straight ahead during an attack, the damage that the player or the opponent has suffered as a result of an attack is calculated by subtracting the defense capacity from the offensive strength. The process at step S7 is repeated until the player's game machine has received the defense capacity of the opponent. If the player's game machine has received the defense capacity, it will calculate damage from the player's offensive strength and the defense capacity of the opponent.

In this fighting sport game, specific stamina points are given to each player at the start of the game. The damage that each player has suffered from the opponent is subtracted from his stamina points. Each player is allowed to attack and defend five times. The player whose stamina points are fewer than those of the opponent or the player whose stamina points have reduced to zero in the course of the game loses.

At step S9, the damage that the opponent has suffered is calculated from the player's offensive strength and the opponent's defense capacity. The calculated damage is subtracted from the stamina points that the opponent has at present, thereby updating the opponent's stamina points.

The opponent's stamina points and the player's stamina points are stored in the registers in the RAM 20. At step S9, the opponent's and player's stamina points are updated.

Then, at step S10, it is judged which player has no stamina points left. If both players have stamina points left, or the number of stamina points of both players is not zero, control will proceed to step S11, where it will be judged whether or not each of attacking and defending has been done five times. When both of attacking and defending have been done five times, or when at step S10, it has been judged that the number of stamina points is zero, the player's stamina points are compared with the opponent's stamina points and the one who has more stamina points is determined to be a winner.

When at step S11, each of attacking and defending has not been done five times, or when at step S2, it has been judged that the player is not allowed to attack first, control will proceed to step S13, where the player's machine has received the offensive strength from the opponent's machine. If it has not received the offensive strength, the process at step S13 is repeated until the transceiver section 31 has received the opponent's offensive strength. If the transceiver section 31 has received the opponent's offensive strength, a defense sound that informs the player that he has been attacked will be generated at step S14. At step S15, the acceleration sensor 12 is turned on for 1.8 seconds to sense the maximum value of the acceleration of the offensive strength. The reason why the time during which the acceleration sensor 12 remains on is limited to 1.8 seconds is to limit the response time from the instance that the player was attached to when he starts to defend. That is, when the player defends rapidly within 1.8 seconds since he heard the defense sound, the defensive strength is effective, but when he reacts later than 1.8 seconds, the defensive strength is invalid.

When the player's machine has obtained the defense capacity, it causes the transceiver section 31 to transmit the defense capacity to the opponent. At step S18, the damage that the player has suffered from the attack is calculated by subtracting the player's defense capacity from the opponent's offensive strength received by the transceiver section 31. At step S19, the damage is subtracted from the player's stamina points, thereby updating his stamina points. At the same time, the opponent damage is subtracted from the opponent's stamina points, thereby updating the opponent's stamina points. Then, at step S20, it is judged which player has no stamina points left. If the number of stamina points is not zero, it will be judged whether or not each of attacking and defending has been done five times. If both of attacking and defending have been done five times, victory or defeat will be determined from the player's and opponent's stamina points at step S12. The result is forced to appear on the display section 22. If attacking and defending have not been done five times, control will return to step S3, where the processes for attacking and defending will be repeated.

While in the second embodiment, the attacking side receives the opponent's defense capacity and calculates the opponent's damage from the opponent's defense capacity and the attacking side's offensive strength, the opponent side may calculates its own damage and the remaining stamina points and transmit the calculated stamina points to the attacking side.

While in the embodiments, the case where the present invention has bee applied to the fighting sport game has been explained, the invention may be applied to various games.

For instance, the present invention may be applied to a baseball game (pitching game) and a dodge ball game by sensing the speed at which the player throws a ball with a movement measuring device. The invention may be also applied to a tennis game, a golf game, and a baseball game (batting game) by sensing the strength of swing with a movement measuring device.

While in the embodiments, the movement measuring device is worn on the arm, it may be worn on the ankle and the strength of a kick be measured. In this case, the present invention may be applied to a soccer game in addition to fighting sport games.

What is claimed is:

1. A movement measuring device comprising:
    an acceleration sensor that is worn on a human body and senses an acceleration of a movement of the human body;
    maximum acceleration sensing means for sensing a maximum value of the acceleration sensed by said acceleration sensor during a specific movement of the human body; and
    input means for inputting a weight; and
    impact computing means for computing an impact power generated by the specific movement of the human body, based on the inputted weight and the maximum value of the acceleration sensed by said maximum acceleration means.

2. A movement measuring device according to claim 1, wherein said impact computing means computes the impact Power based on the inputted weight and a value obtained by multiplying the maximum value of the acceleration by a constant.

3. A movement measuring device according to claim 1, wherein said impact computing means computes the impact power by multiplying a square of a speed corresponding to the maximum value of the acceleration by the inputted weight and a constant.

4. A movement measuring device according to claim 1, further comprising speed computing means for computing a speed produced by the specific movement of the human body based on the maximum value of the acceleration, and a display for displaying the speed computed by said speed computing means.

5. A movement measuring device according to claim 1, further comprising a display for displaying the impact power computed by said impact computing means.

6. A movement measuring device according to claim 1, wherein the device is housed in a case having bands at both ends thereof that enable the device to be worn on the human body.

7. A movement measuring device according to claim 6, wherein said acceleration sensor senses the acceleration in a direction perpendicular to a longitudinal direction of said bands.

8. A movement measuring device according to claim 1, wherein the device is housed in a case having bands at both ends thereof that enable the device to be worn on an arm.

9. A movement measuring device according to claim 8, wherein said acceleration sensor senses the acceleration in a direction from three o'clock to nine o'clock or vice versa on a watch face.

10. A movement measuring device according to claim 8, further comprising a time display for displaying a time on said case.

11. An electronic game machine comprising:
    an acceleration sensor that is worn on a human body and senses an acceleration of a movement of the human body;
    computing means for producing data indicating a magnitude of movement based on the acceleration sensed by said acceleration sensor; and
    decision means for determining victory or defeat based on the data indicating the magnitude of the specific movement of the human body produced by said computing means.

12. An electronic game machine according to claim 11, wherein:
    said computing means includes means for producing data based on a first acceleration sensed during a first period, and means for producing data based on a second acceleration sensed during a second period, and
    said decision means determines victory or defeat based both on the data produced based on the first acceleration sensed during said first period and the data produced based on the second acceleration sensed during said second period.

13. An electronic game machine according to claim 12, further comprising sound generation means for producing different sounds respectively corresponding to said first period and said second period.

14. An electronic game machine according to claim 11, further comprising a display for displaying the victory or defeat determined by said decision means.

15. An electronic game machine according to claim 11, wherein the machine is housed in a case having bands at both ends thereof that enable the machine to be worn on the human body.

16. An electronic game machine according to claim 11, wherein said acceleration sensor senses the acceleration in a direction perpendicular to a longitudinal direction of said bands.

17. An electronic game machine according to claim 11, wherein the machine is housed in a case having bands at both ends thereof that enable the machine to be worn on an arm.

18. An electronic game machine according to claim 11, wherein said acceleration sensor senses the acceleration in a direction from three o'clock to nine o'clock or vice versa on a watch face.

19. An electronic game machine according to claim 17, further comprising a time display for displaying a time on said case.

20. An electronic game machine according to claim 11, further comprising a receiver for receiving data transmitted from an external device, and wherein said decision means determines victory or defeat based both on the data produced by said computing means and the data received by said receiver.

21. An electronic game machine according to claim 20, further comprising a transmitter for transmitting the data produced by said computing means.

22. A method of measuring a magnitude of a specific movement of a human body, comprising:
determining a maximum value of an acceleration of the specific movement based on an acceleration detected by an acceleration sensor worn on the human body; and
computing an impact power generated by the specific movement of the human body based on an input weight and the maximum value of the acceleration.

23. A method according to claim 22, wherein said impact power is computed based on the inputted weight and a value obtained by multiplying the maximum value of the acceleration by a constant.

24. A method according to claim 22, wherein said impact power by multiplying a square of a speed corresponding to the maximum value of the acceleration by the inputted weight and a constant.

25. A method according to claim 22, further comprising computing a speed produced by the specific movement of the human body based on the maximum value of the acceleration, and displaying the computed speed.

26. A method according to claim 22, further comprising displaying the computed impact power.

27. An electronic game method comprising:
sensing an acceleration produced by a specific movement of a human body using an acceleration sensor worn on the human body;
producing data indicating a magnitude of the specific movement based on the sensed acceleration; and
determining victory or defeat based on the produced data indicating the magnitude of the specific movement.

28. An electronic game method according to claim 27, wherein:
data is produced based on a first acceleration sensed during a first period, and based on a second acceleration sensed during a second period, and
said victory or defeat is determined based on both the data produced based on the first acceleration sensed during said first period and the data produced based on the second acceleration sensed during said second period.

29. An electronic game method according to claim 27, wherein said victory or defeat is determined by:
changing a player's points and an opponent's points based on the sensed acceleration; and
comparing the player's points with the opponent's points.

30. An electronic game method according to claim 27, further comprising displaying the victory or defeat.

31. An electronic game method according to claim 27, further comprising receiving data transmitted from an external device, and wherein said victory or defeat is determined both based on the received data and the produced data indicating the magnitude of the specific movement.

32. An electronic game method according to claim 31, further comprising transmitting the produced data indicating the magnitude of the specific movement.

33. A storage medium having a computer-readable program stored thereon, said computer-readable program comprising:
code means for instructing a computer to determine a maximum value of an acceleration during a specific movement of a human body based on an acceleration detected by an acceleration sensor worn on the human body; and
code means for instructing the computer to compute an impact sower generated by the specific movement of the human body based on an input weight and the maximum value of the acceleration.

34. A storage medium according to claim 33, wherein the computer-readable program further comprises code means for instructing the computer to compute a speed produced by the specific movement of the human body based on the maximum value of the acceleration, and code means for instructing the computer to display the computed speed.

35. A storage medium according to claim 33, wherein the computer-readable program further comprises code means for instructing the computer to display the computed impact power.

36. A storage medium having a computer-readable program stored thereon for executing a game in accordance with an acceleration sensed by an acceleration sensor worn on a human body, said computer-readable program comprising:
program code means for, when the human body makes a specific movement, producing data indicating a magnitude of said specific movement based on the the acceleration sensed by said acceleration sensor worn on the human body; and
program code means for determining victory or defeat based on the produced data indicating the magnitude of the specific movement.

37. A storage medium according to claim 36, wherein the computer-readable program further comprises:
code means for producing data based on a first acceleration sensed by said acceleration sensor during a first period;
code means for obtaining data based on a second acceleration sensed by said acceleration sensor during a second period; and
code means for determining the victory or defeat based on both the data produced based on the first acceleration sensed during the first period and the data produced based on the second acceleration sensed during the second period.

38. A storage medium according to claim 36, wherein the computer-readable program further comprises:

code means for changing a player's points and an opponent's points based on the data indicating the magnitude of the specific movement; and code means for determining the victory or defeat by comparing the player's points with the opponent's points.

39. A storage medium according to claim 36, wherein the computer-readable program further comprises code means for instructing the computer to display the victory or defeat.

40. A storage medium according to claim 36, wherein the computer-readable program further comprises:

code means for receiving data transmitted from an external device; and code means for determining the victory or defeat based on both the received data and the produced data indicating the magnitude of the specific movement.

41. A program storage medium according to claim 40, wherein said computer-readable program further comprises code means for transmitting the produced data indicating the magnitude of the specific movement.

* * * * *